Jan. 5, 1965  J. A. GAYLORD  3,163,905
ADJUSTABLE WEBBING ADAPTER

Filed Sept. 20, 1962  3 Sheets-Sheet 1

INVENTOR.
JOHN A. GAYLORD
BY George B. White
ATTORNEY

Jan. 5, 1965  J. A. GAYLORD  3,163,905
ADJUSTABLE WEBBING ADAPTER
Filed Sept. 20, 1962  3 Sheets-Sheet 2
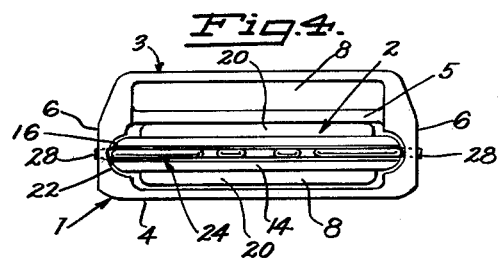
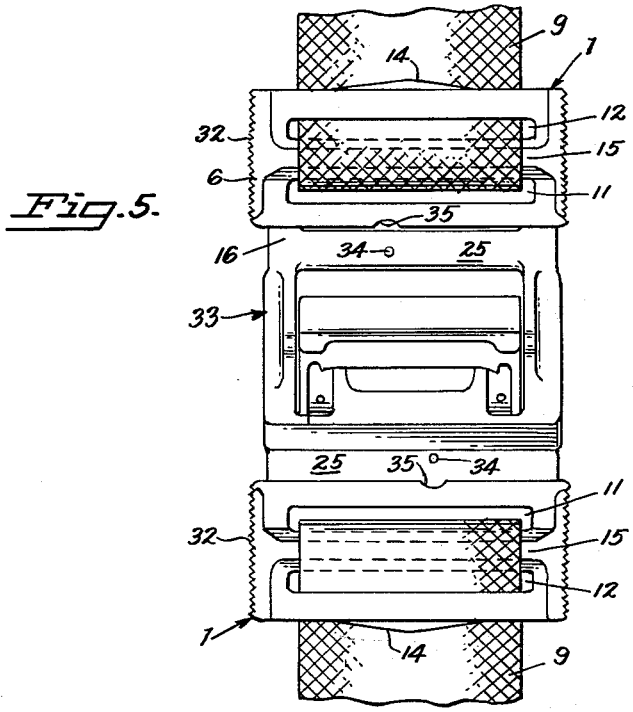
INVENTOR.
JOHN A. GAYLORD
BY
George B. White
ATTORNEY Jan. 5, 1965
J. A. GAYLORD
3,163,905
ADJUSTABLE WEBBING ADAPTER
Filed Sept. 20, 1962
3 Sheets-Sheet 3
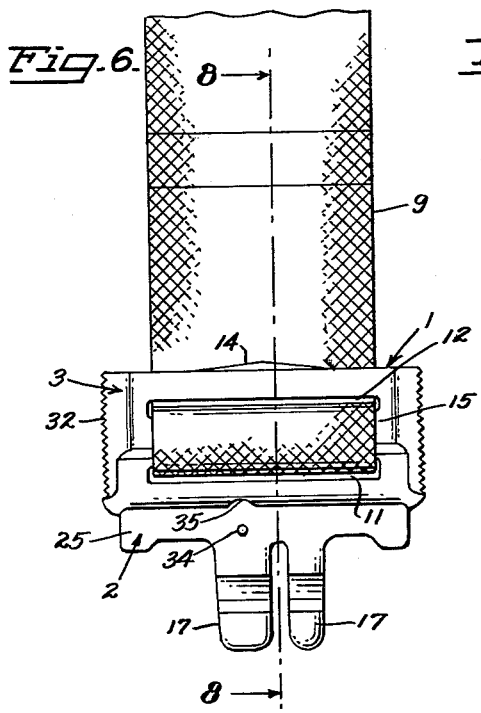
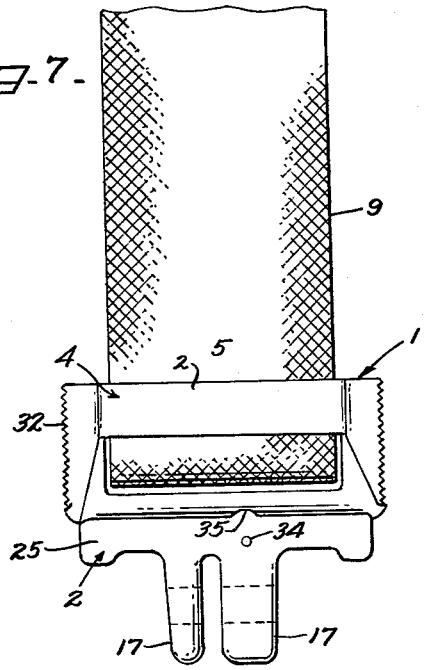
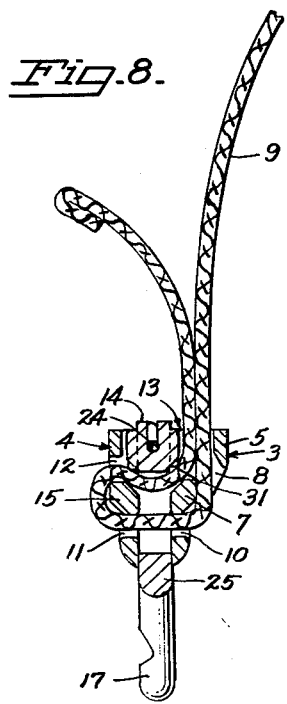
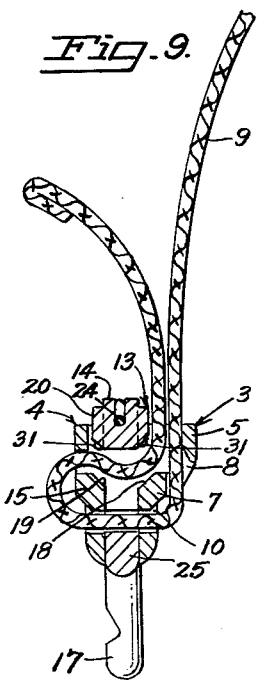
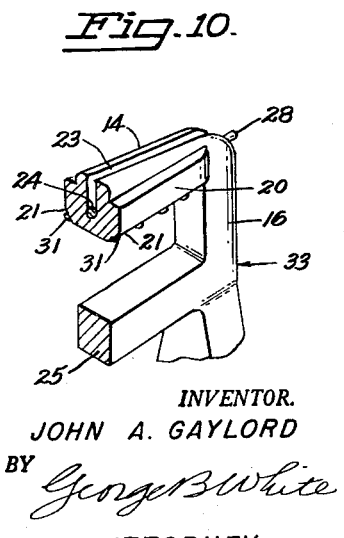
INVENTOR.
JOHN A. GAYLORD
BY George B White
ATTORNEY

United States Patent Office 3,163,905
Patented Jan. 5, 1965

3,163,905
ADJUSTABLE WEBBING ADAPTER
John A. Gaylord, San Rafael, Calif., assignor to H. Koch & Sons, Corte Madera, Calif., a corporation of California
Filed Sept. 20, 1962, Ser. No. 225,072
11 Claims. (Cl. 24—196)

This invention relates to an adjustable webbing connector or adapter.

The primary object of this invention is to provide adjustable webbing adapters to form connector elements on straps or webbings in such a manner that the load on the webbing and on the connector element increases the grip on the webbing adjustment and prevents slippage, yet the webbing can be manipulated easily for adjustment either for tightening or loosening with the exertion of comparatively small pulling force on the webbing.

Another object of the invention is to provide a webbing adapter and connector in which a sleeve or cage receives a connector insert and in which the webbing can be so threaded through slots of the sleeve and through the connector insert that the resultant force exerted by the load on the connector insert clamps the webbing tightly in the adapter, yet by relief of the load on the sleeve adjustment of the webbing in either direction is permitted with comparatively slight pull.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 4 is a top plan view of the assembled adapter.

FIG. 5 is an assembled front elevation of the adapter on a female connector element of a canopy release, showing the male connector element of the canopy release inserted upwardly into the female and also provided with the adapter, with the webbing in both adapters.

FIG. 6 is a front view of the adapter on a male connector, the prongs directed downwardly.

FIG. 7 is a rear view of the male connector with the webbing adapter.

FIG. 8 is a section view taken on lines 8—8 of FIG. 6.

FIG. 9 is the same sectional view as in FIG. 8, showing the sleeve loosened, and FIG. 10 is a fragmental, partly sectional perspective view of the insert element of the adapter.

Figure 1:
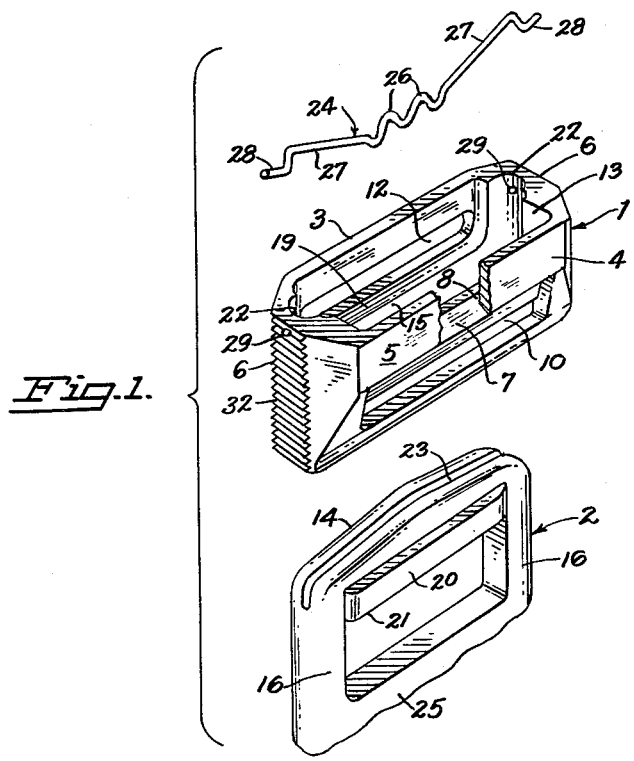
FIG. 1 is a perspective developed view of the component parts of the adjustable webbing adapter.
Figure 2:
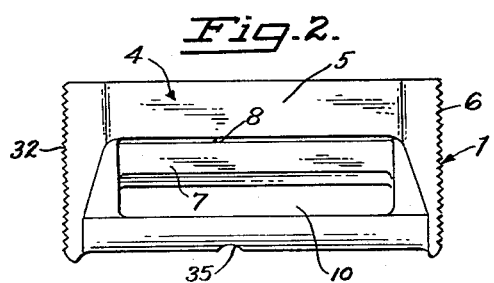
FIG. 2 is a rear view of the cage or sleeve of the adapter.
Figure 3:
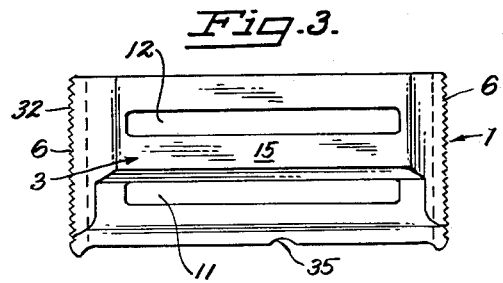
FIG. 3 is a front view of the sleeve.

The two primary elements of the webbing adapter are a cage or sleeve 1 and a connector element 2 which slidably fits into the sleeve 1.

The sleeve is generally oblong cross-sectionally and its walls for facility of identification are denoted herein as a front face 3, a rear face 4 and ends 6.

Viewing FIG. 1, the top portion of the rear face 4 of the sleeve 1 is flared outwardly and forms an upper wall strip 5. Spaced below and inwardly of the upper wall strip 5 is a middle wall strip 7.

There are a pair of slots formed through the front face 3 and rear face 4 in general registry for threading the end of webbing 9 through and across the sleeve 1 as hereinafter described. All the slots are transverse on the respective faces of the sleeve 1.

The first slot 8 to receive the end of the webbing 9 is between the outwardly flared upper wall strip 5 and the top edge of the middle wall strip 7 so that the first slot 8 faces generally downwardly to guide the end of the webbing 9 along the outside of the rear face 4.

The second slot 10 is below and along the lower edge of the middle wall strip 7 and is parallel with the first slot 8.

The third slot 11 is through the front face 3 opposite to the second slot 10 so that the webbing 9 is threaded through the lower second and third slots 10 and 11 across the sleeve 1.

The webbing 9 is then threaded from the third slot 11 upwardly along a front middle wall strip 15 and then through a fourth slot 12 and across the top of the sleeve 1 returning into the space 13 formed at the inside of the upper cross wall 5, and then out under the entering portion of the webbing 9.

The front and rear middle wall strips 7 and 15 are thicker than the lower portions of the walls of the sleeve 1 below the second and third slots 10 and 11.

The connector element 2 is formed into a loop fitting into the sleeve 1 so that the webbing 9 is passed through the loop between the second and third slots 10 and 11 and on the return from the upper fourth slot 12.

The connector element 2 has a top rail 14, a lower rail or body 25 and sides 16 perpendicular between the rail 14 and body 25. The body 25 may have thereon male or female connectors. For instance in FIG. 6 male prongs 17 extend from the body 25 for engagment with a suitable female or keeper connector.

When the connector element 2 is under load, its top rail 14 is pulled into the flared top space 13 of the sleeve 1. A mitered seat 18 is formed on the inner top edge of the rear middle wall strip 7. Another mitered seat 19 is formed along the inner top edge of the front middle wall strip 15. The mitered seats 18 and 19 are respectively below the first and fourth slots 8 and 11 respectively. Both mitered seats 18 and 19 taper inwardly and downwardly of the sleeve 1.

The top rail 14 of the connector element 2 is widened, in this illustration by side strips 20 secured to opposite sides of the top rail 14 so that the top rail 14 is wider than the passage through the sleeve between said seats 18 and 19. The longitudinal corner lower edges 21 of the side strips 20 of the top rail 14 are mitered outwardly and upwardly of the top rail 14 so as to complement the seats 18 and 19. Thus when the connector element 2 is pulled by the load into the sleeve 1 the mitered edges 21 of the top rail 14 tightly clamp the webbing 9 against the mitered seats 18 and 19. The pull of the load tightens this clamping. The outer lower edges of the middle strips 8 and 15 are also mitered as shown in FIGS. 8 and 9.

Along the inside of each end 6 of the sleeve 1 is formed a guide channel 22. The sides 16 of the connector element 2 are rounded and spaced so as to slidably fit in said guide channels 22.

In the outside top of the top rail 14 is a longitudinal groove 23 to accommodate a retaining spring 24. This spring 24 has multiple bows 26 intermediate its ends and a straight stem 27 leads to each side from said bows 26. Each stem 27 terminates in a hook 28. The straight stems 27 extend at such angles as to form generally a bow spring biased about said multiple bows 26 in the center. The convex side of this bow spring is laid into the longitudinal groove 23 and then the stems 27 of the bow are straightened toward the groove 23 until the end hooks 28 are inserted in holes 29 near the top of each guide chanel 22. Thus the tension of the bow spring urges the connector element 2 inwardly of the sleeve 1 and resiliently urges the top rail 14 against the mitered seats 18 and 19. For the purpose of threading the webbing 9 on the return from the rear upper or fourth slot 12 it is necessary to push the connector element 2 so as to align the loop with the fourth slot 12 to leave space for the webbing.

For firmer and positive gripping the mitered edges 21 of the top rail 14 have a series of penetrating nodules or bumps 31 thereon which bite into the webbing material to positively prevent slippage.

The outer faces 32 of the ends 6 of the sleeve 1 are roughened or serrated to facilitate manipulation of the sleeve.

To limit the relative movement of the connector element 2 a stop pin 34 is fixed transversely through body 25 to abut in a recess 35 in the lower edge of the sleeve 1.

In FIG. 5, the connector element is shown with a female connector 33 into which the prongs 17 can be releasably locked in the manner described in my copending application for Canopy Release executed on September 6, 1962.

In operation the end of the webbing 9 is inserted through the flared space 13 and first slot 8 through the inclined wall 7 and then along the rear face 4 of the sleeve 1. Then the webbing end is threaded through the second slot 10, the loop of the connector element 2 and through the third slot 11, and then upwardly along the front face 3 and to fourth slot 12. Then the connector element 2 is pushed toward the flared end of the sleeve 1 against the tension of said bow spring so as to raise the top rail 14 from the mitered seats 18 and 19, and the end of the webbing 9 is threaded through the fourth slot 12 and between the top rail 14 and the mitered seats 18 and 19 and out through the flared end, so that the webbing 9 is thus turned upon itself.

As the load pulls on the connector element 2 the portion of the webbing 9 through the second and third slots 10 and 11 pushes the sleeve 1 toward the top rail 14 and thus the clamping action between the mitered seats 18 and 19 and the edges 21 of the top rail 14 of the connector element is enhanced.

To shorten the webbing 9 the end of the webbing is pulled whereby a force is exerted to loosen the grip between said mitered seats 18 and 19 and the top rail 14 so that the webbing can be pulled in the direction of its initial threading with a comparatively slight pull, in present practice not in excess of 25 pounds, irrespective of the load.

To lengthen the webbing the operator grips the serrated ends of the sleeve 1 between the thumb and the index finger and with the middle fingers bears against the connector element 2 and pushes the sleeve 1 on the connector element 2 against the tension of said bow spring so as to relieve the load pressure on the mitered seats 18 and 19 sufficiently to permit the webbing 9 to be pulled oppositely to its initial threading. Then by releasing the sleeve 1 the load will again cause the firm gripping of the webbing 9 in the adjusted attitude.

I claim:

1. In an adjustable webbing adapter having a loop frame insertable in a sleeve, the improvement of
   (a) spaced opposite sides forming said sleeve
   (b) each side of said sleeve having a pair of perpendicularly spaced transverse slots, the slots on the opposite sides of the sleeve being generally in registry for threading the webbing through two slots along one side of said sleeve and then through said loop frame and through the slots along the other side of said sleeve returning said webbing again through said loop frame to the area of the original insertion and
   (c) gripping seats below the registering slots nearer to the end of the sleeve through which the webbing is introduced for threading, said gripping seats being adapted to be engaged by said loop frame for gripping the return portion of the webbing, said webbing being gripped having a portion introduced into said sleeve and extending through said nearer slot on one side and along a portion of the same side and through the spaced parallel slot on the same side and then through the opposite spaced slot on the other side and along a portion of the other side and through the nearer slot of the other side through the loop frame and back along the top of the loop frame and underlying the portion of said web introduced into said sleeve so that the load on the loop frame tightens the grip on said webbing and so that said grip can be loosened by relative movement of the sleeve to the loop frame.

2. The invention defined in claim 1 and
   (a) said gripping seats being mitered.

3. The invention defined in claim 1, and
   (a) the side of said sleeve at the end at which said webbing is inserted for threading being flared outwardly, and the slot adjacent said flared side being through an inclined wall of said flared portion.

4. The invention defined in claim 3 and
   (a) the opposite edges of said sleeve having guide channels along the inside thereof for guiding said loop frame.

5. In an adjustable webbing adapter
   (a) a sleeve including
   (b) a front side
   (c) a rear side
   (d) an outwardly flared wall at one end of the sleeve on the rear side
   (e) said sleeve having a system of slots including a first slot extending longitudinally under and through the outwardly flared wall of the rear side, a second slot through the rear side perpendicularly spaced below said first slot, a third slot through the front side registering with said second slot, and a fourth slot through the front side registering with said first slot,
   (f) a loop frame insertable longitudinally through said sleeve
   (g) a cross head on said frame adjacent said flared wall
   (h) and coacting gripping seats on said cross head of said frame and in said sleeve for gripping webbing threaded through said system of slots and between said gripping seats, the webbing being gripped having a portion extending through the first slot and along a portion of the rear side and through the second slot and through said sleeve and through said third slot and then along a portion of the front side and through the fourth slot and loop frame and under said cross head and back along a portion of said cross head and out of said sleeve over-lying the portion of the web at said outwardly flared wall.

6. The invention defined in claim 5 and
   (a) said transverse cross head of said loop frame being wider than the width of the loop, and said coacting seats being on the edges of said widened cross head and along said first and fourth slots in the sleeve
   (b) said loop frame being adapted for connection with a part of releasable webbing connectors.

7. The invention defined in claim 5 and spring means anchored in said sleeve and bearing on said cross head of said loop frame for urging said coacting seats toward one another into webbing gripping position.

8. The invention defined in claim 7 and
   (a) longitudinal end members of said sleeve having opposite longitudinal guide channels formed thereon for guiding said loop frame.

9. In an adjustable webbing adapter.
   (a) a sleeve (b) a loop frame adapted to be connected to a webbing connector means and slidable in said sleeve (c) an enlarged cross head on said loop frame (d) a system of slots through said sleeves including two pairs of parallel slots on opposite sides of the sleeve, the pair of slots on one side registering with the respective slots of the pair on the other side for threading webbing from one end of the sleeve through the pair of slots on one side and then through said loop frame and through the pair of slots on the other side and back through the loop frame under said enlarged head and back over a portion of the said cross head so as to underly a portion of the webbing threaded through said one end of the sleeve (e) coacting gripping seats on said enlarged head and in said sleeve along the slots through which said webbing is returned to grip the returning portion of said webbing by the load pull on said loop frame (f) and resiliently yieldable means to urge said loop frame into gripping position so anchored in said sleeve as to relieve said gripping by moving said sleeve against the action of said resiliently yieldable means.

10. The adjustable webbing adapter defined in claim 9, and (a) gripping projections at least on the gripping seats on said enlarged head.

11. The adjustable webbing adapter defined in claim 9

(a) and a limit element on said loop frame engaging said sleeve to limit withdrawal of the loop frame from the sleeve.

References Cited by the Examiner

UNITED STATES PATENTS

| 706,080 | 8/02 | Mitchell | 24—171 |
|---|---|---|---|
| 733,120 | 7/03 | Baldwin | 24—194 |
| 1,729,608 | 10/29 | Clark | 24—196 |
| 1,958,911 | 5/34 | Christoffersen | 24—265 |
| 2,458,304 | 1/49 | Runde | 24/126 |
| 2,549,735 | 4/51 | White et al. | 24—136 X |
| 2,754,560 | 7/56 | Warner et al. | 24—196 |
| 2,938,254 | 5/60 | Gaylord | 24—171 |
| 3,078,536 | 2/63 | Bauer | 24—194 |

FOREIGN PATENTS

| 710,761 | 6/31 | France. |
|---|---|---|
| 57,273 | 10/52 | France. |
| 252,886 | 10/12 | Germany. |

M. HENSON WOOD, JR., *Primary Examiner.*